(12) United States Patent
Ogawa et al.

(10) Patent No.: US 9,917,986 B2
(45) Date of Patent: Mar. 13, 2018

(54) CONTROLLERS, CONTROL METHOD, AND NON-TRANSITORY COMPUTER-READABLE RECORDING MEDIUM

(71) Applicant: CANON KABUSHIKI KAISHA, Tokyo (JP)

(72) Inventors: Nobuhiro Ogawa, Tokyo (JP); Yoshiko Sueshige, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/165,607

(22) Filed: May 26, 2016

(65) Prior Publication Data

US 2016/0352977 A1    Dec. 1, 2016

(30) Foreign Application Priority Data

May 29, 2015    (JP) ................................. 2015-110373

(51) Int. Cl.
H04N 1/60          (2006.01)

(52) U.S. Cl.
CPC ................................. H04N 1/6094 (2013.01)

(58) Field of Classification Search
None
See application file for complete search history.

(56) References Cited

U.S. PATENT DOCUMENTS

| | | | |
|---|---|---|---|
| 6,585,341 B1* | 7/2003 | Walker | B41J 2/125 250/559.44 |
| 7,792,378 B2* | 9/2010 | Liege | G06T 1/0007 358/2.1 |
| 8,384,927 B2* | 2/2013 | Harmon | G06F 3/1204 358/1.15 |
| 9,333,782 B1* | 5/2016 | Hashimoto | G06F 3/1203 |
| 2003/0217662 A1* | 11/2003 | Koifman | B41B 1/00 101/484 |
| 2005/0031392 A1* | 2/2005 | Yamamoto | B41J 11/009 400/62 |
| 2006/0020365 A1* | 1/2006 | Takeda | G03G 15/6591 700/226 |

(Continued)

FOREIGN PATENT DOCUMENTS

JP          2013-214269 A      10/2013

*Primary Examiner* — Madelein Nguyen
(74) *Attorney, Agent, or Firm* — Canon USA, Inc. I.P. Division

(57) ABSTRACT

A controller includes an acquisition unit that acquires paper type information from each of a plurality of image output devices managed in a management system, a grouping unit that performs grouping of a plurality of managed image output devices based on paper information acquired by the acquisition unit, and a display controller that displays the managed image output devices having undergone the grouping performed by the grouping unit on a display unit. If the acquisition unit acquires current-fed-paper-type information, the grouping unit performs the grouping based on the current-fed-paper-type information. If the acquisition unit does not acquire the current-fed-paper-type information, the grouping unit performs the grouping based on calibration-executable paper type information included in the paper type information acquired by the acquisition unit.

17 Claims, 11 Drawing Sheets

(56) References Cited

U.S. PATENT DOCUMENTS

| | | | |
|---|---|---|---|
| 2006/0275066 A1* | 12/2006 | Mima | B41J 3/46 400/76 |
| 2009/0160117 A1* | 6/2009 | Negishi | B65H 3/44 271/3.14 |
| 2009/0168089 A1* | 7/2009 | Hachiro | H04N 1/2158 358/1.13 |
| 2010/0066817 A1* | 3/2010 | Zomet | H04N 13/0404 348/51 |
| 2010/0328688 A1* | 12/2010 | Sakamoto | H04N 1/6052 358/1.9 |
| 2011/0063640 A1* | 3/2011 | Tanaka | H04N 1/6033 358/1.9 |
| 2011/0109928 A1* | 5/2011 | Radtke | G03F 3/108 358/1.9 |
| 2012/0206745 A1* | 8/2012 | Shibuya | H04N 1/6033 358/1.9 |
| 2013/0155427 A1* | 6/2013 | Ichihashi | H04N 1/60 358/1.9 |
| 2013/0342861 A1* | 12/2013 | Sato | H04N 1/6033 358/1.9 |
| 2014/0063550 A1* | 3/2014 | Wilen | G06F 3/1204 358/1.15 |
| 2015/0217965 A1* | 8/2015 | Zhang | B65H 45/20 493/430 |
| 2015/0317111 A1* | 11/2015 | Pandit | G06F 3/1288 358/1.14 |
| 2017/0064114 A1* | 3/2017 | Fujii | H04N 1/00779 |

* cited by examiner

FIG. 5

| MANAGED TERMINAL | DEVICE NAME 501 | DEVICE ADDRESS 502 | PAPER INFORMATION (PAPER TYPE) 503 | CALIBRATION APPLICATION STATUS 504 | CALIBRATION-EXECUTION-DATE INFORMATION 505 |
|---|---|---|---|---|---|
| IMAGE OUTPUT DEVICE A | PRINTER A | XXX.XXX.XXX.XXX | PAPER A (CALIBRATION-EXECUTABLE PAPER) | UNAPPLIED | – |
| IMAGE OUTPUT DEVICE B | PRINTER B | XXX.XXX.XXX.XXX | PAPER A (CALIBRATION-EXECUTABLE PAPER) | APPLIED | 07/01/2014 13:05:15 |
| IMAGE OUTPUT DEVICE C | PRINTER C | XXX.XXX.XXX.XXX | PAPER A (CALIBRATION-EXECUTABLE PAPER) | APPLIED | 07/01/2014 13:05:10 |
| IMAGE OUTPUT DEVICE D | PRINTER D | XXX.XXX.XXX.XXX | PAPER B (CALIBRATION-UNEXECUTABLE PAPER) | NO DATA | – |
| IMAGE OUTPUT DEVICE E | PRINTER E | XXX.XXX.XXX.XXX | PAPER B (CALIBRATION-UNEXECUTABLE PAPER) | NO DATA | – |
| IMAGE OUTPUT DEVICE F | PRINTER F | XXX.XXX.XXX.XXX | PAPER A (CALIBRATION-EXECUTABLE PAPER) | APPLIED | 08/11/2014 16:00:23 |
| IMAGE OUTPUT DEVICE G | PRINTER G | XXX.XXX.XXX.XXX | PAPER A (CALIBRATION-EXECUTABLE PAPER) | UNAPPLIED | – |

| MANAGED TERMINAL 500 | DEVICE NAME 501 | DEVICE ADDRESS 502 | PAPER INFORMATION (PAPER TYPE) 503 | CALIBRATION APPLICATION STATUS 504 | CALIBRATION-EXECUTION-DATE INFORMATION 505 |
|---|---|---|---|---|---|
| IMAGE OUTPUT DEVICE A | PRINTER A | XXX.XXX.XXX.XXX | PAPER A (CALIBRATION-EXECUTABLE PAPER) | UNAPPLIED | - |
| IMAGE OUTPUT DEVICE B | PRINTER B | XXX.XXX.XXX.XXX | PAPER A (CALIBRATION-EXECUTABLE PAPER) | APPLIED | 07/01/2014 13:05:15 |
| IMAGE OUTPUT DEVICE C | PRINTER C | XXX.XXX.XXX.XXX | PAPER A (CALIBRATION-EXECUTABLE PAPER) | APPLIED | 07/01/2014 13:05:10 |
| IMAGE OUTPUT DEVICE D | PRINTER D | XXX.XXX.XXX.XXX | PAPER B (CALIBRATION-UNEXECUTABLE PAPER) | NO DATA | - |
| IMAGE OUTPUT DEVICE E | PRINTER E | XXX.XXX.XXX.XXX | PAPER B (CALIBRATION-UNEXECUTABLE PAPER) | NO DATA | - |
| IMAGE OUTPUT DEVICE F | PRINTER F | XXX.XXX.XXX.XXX | - | - | - |
| IMAGE OUTPUT DEVICE G | PRINTER G | XXX.XXX.XXX.XXX | - | - | - |

CONTROLLERS, CONTROL METHOD, AND NON-TRANSITORY COMPUTER-READABLE RECORDING MEDIUM

BACKGROUND OF THE INVENTION

Field of the Invention

The present invention relates to controllers, a control method, and a non-transitory computer-readable recording medium for causing a plurality of image output devices to maintain the same colors.

Description of the Related Art

When an image is output by image output devices such as printers based on the same image data, colors observed on a recording medium such as paper differ depending on the image output device in some cases. This is because differences in the recording head exist between individual printers and recording heads are subjected to change over time, and thus individual printers have different amounts of ink ejection. A known method for causing printers to ensure the same colors are output on a recording medium is calibration in which input image data is corrected for each printer. In the calibration, a patch image is recorded on the recording medium by a recording head and subsequently undergoes colorimetry. Based on the result of the colorimetry, color correction is performed on the input image data for each printer. The printer has a memory for registering, for each paper type, not only color correction information, but also paper information for controlling the amount of ink application and the height of the recording head. The paper information and the color correction information are managed in association with each other.

As a system for managing color correction states of a plurality of image output devices, a color-correction-state management system that presents information regarding the state of color correction in association with paper types set for the respective image output devices has been proposed (Japanese Patent Laid-Open No. 2013-214269). In the color-correction-state management system proposed in Japanese Patent Laid-Open No. 2013-214269, information regarding the current paper fed in each managed image output device is acquired from the image output device, and the image output devices are managed on a per-group basis by using the information regarding the current fed paper.

In Japanese Patent Laid-Open No. 2013-214269, however, if the information regarding the current paper fed in an image output device is not saved in the image output device, the fed paper information is not acquired by the color correction management system. Accordingly, if fed paper information is not acquirable from a printer, the printer is not managed based on fed paper information by the management system that manages printers.

SUMMARY OF THE INVENTION

The present invention provides a controller including an acquisition unit that acquires paper type information from each of a plurality of image output devices managed in a management system, a grouping unit that performs grouping of a plurality of managed image output devices based on paper information acquired by the acquisition unit, and a display controller that displays the managed image output devices having undergone the grouping performed by the grouping unit on a display unit. If the acquisition unit acquires current-fed-paper-type information, the grouping unit performs the grouping based on the current-fed-paper-type information. If the acquisition unit does not acquire the current-fed-paper-type information, the grouping unit performs the grouping based on calibration-executable paper type information included in the paper type information acquired by the acquisition unit. The present invention also provides a controller including an acquisition unit that acquires paper type information from each of a plurality of image output devices managed in a management system, a grouping unit that performs grouping of a plurality of managed image output devices based on paper information acquired by the acquisition unit, and a display controller that displays the managed image output devices having undergone the grouping performed by the grouping unit on a display unit. If the acquisition unit acquires current-fed-paper-type information, the grouping unit performs the grouping based on the current-fed-paper-type information. If the acquisition unit does not acquire the current-fed-paper-type information, the grouping unit performs the grouping based on any one of information regarding paper type designated by a user and information regarding paper type used for printing each of which is included in the paper type information acquired by the acquisition unit.

Further features of the present invention will become apparent from the following description of exemplary embodiments with reference to the attached drawings.

BRIEF DESCRIPTION OF THE DRAWINGS

FIG. 5 is a table illustrating example data stored in an image-output-device database (DB).

FIG. 7 is a table illustrating example data stored in the image-output-device DB.

DESCRIPTION OF THE EMBODIMENTS

Hereinafter, embodiments of the invention will be described with reference to the attached drawings. The following embodiments do not restrict the invention according to the scope of the claims, and not all the combinations of features described in the embodiments are necessarily essential to the invention.

First Embodiment

First, a management system according to an embodiment will be described. The management system according to the embodiment is a color correction management system for causing a plurality of printing devices to maintain the same tints. The management system monitors the calibration state of each printing device with reference to paper set in the corresponding image output device.

In calibration, measurement is performed on printed paper by using a sensor provided to the image output device, and the characteristics of a recording head (hereinafter, simply referred to as a head) are identified from the measurement result. More specifically, in the calibration, the printing device prints a patch image based on patch data retained in advance in the printing device. Measurement is performed on the printed paper by using the density sensor provided to the printing device, and the characteristics of the head are identified from the measurement result. A correction value leading to the result of the measurement of the head that matches target data (a target value) is then identified. The identified correction value is used, for example, to determine an amount of ink ejected from the head.

The paper used for printing by the image output device is classified mainly into two types of calibration-executable paper and calibration-unexecutable paper. The calibration-executable paper represents a type of paper which is usable to execute calibration. The calibration-unexecutable paper represents a type of paper which is unusable to execute calibration.

A calibration execution result obtained from calibration-executable paper is applicable to a type of paper classified as calibration-executable paper and a type of paper classified as calibration-unexecutable paper. In other words, if calibration is executed in such a manner that a patch image is printed on a specific type of paper classified as calibration-executable paper, the calibration execution result obtained from the type of paper is applied to another type of paper classified as calibration-executable paper. As for a specific type of paper classified as calibration-unexecutable paper, a calibration execution result obtained from calibration-executable paper is always applied to the type of paper classified as calibration-unexecutable paper.

In the embodiment, calibration execution date/time information, a calibration application status, and information regarding current fed paper are acquired from image output devices to be managed, the management system may manage the image output devices on a per-group basis by using these pieces of information.

Figure 1:
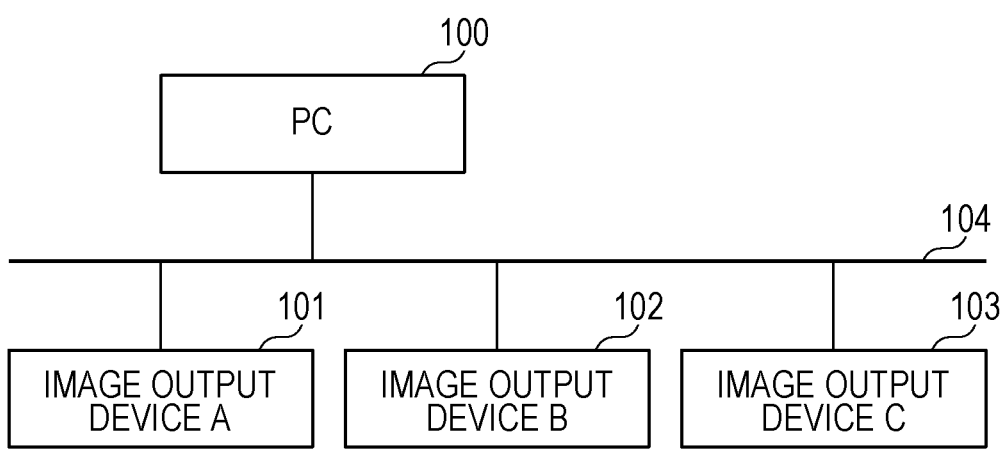
FIG. 1 is a diagram illustrating an example network connection mode of a management system according to an embodiment.

FIG. 1 is a diagram illustrating an example system configuration in the network environment of the system. As illustrated in FIG. 1, a server PC 100 is connectable to image output devices A 101, B 102, and C 103 through a network 104 and monitors the state of each of the image output devices A 101 to C 103. Note that the three image output devices are monitored in the embodiment, but the number of the image output devices is not limited thereto and may be one, two, or four or more.

The image output devices A 101 to C 103 are each an inkjet printer. In the following description, the image output device A 101 is taken as an example unless otherwise particularly noted. The image output devices B 102 and C 103 have the same functions. The image output device A 101 is capable of feeding various types of paper and has a calibration function.

The PC 100 has a function of managing image output devices illustrated as the image output devices A 101 to C 103. Specifically, the PC 100 has a function of notifying the management target image output devices of the calibration execution result information regarding the current fed paper and a function of grouping the management target image output devices and displaying the management target image output devices on the screen of the PC 100.

Figure 2:
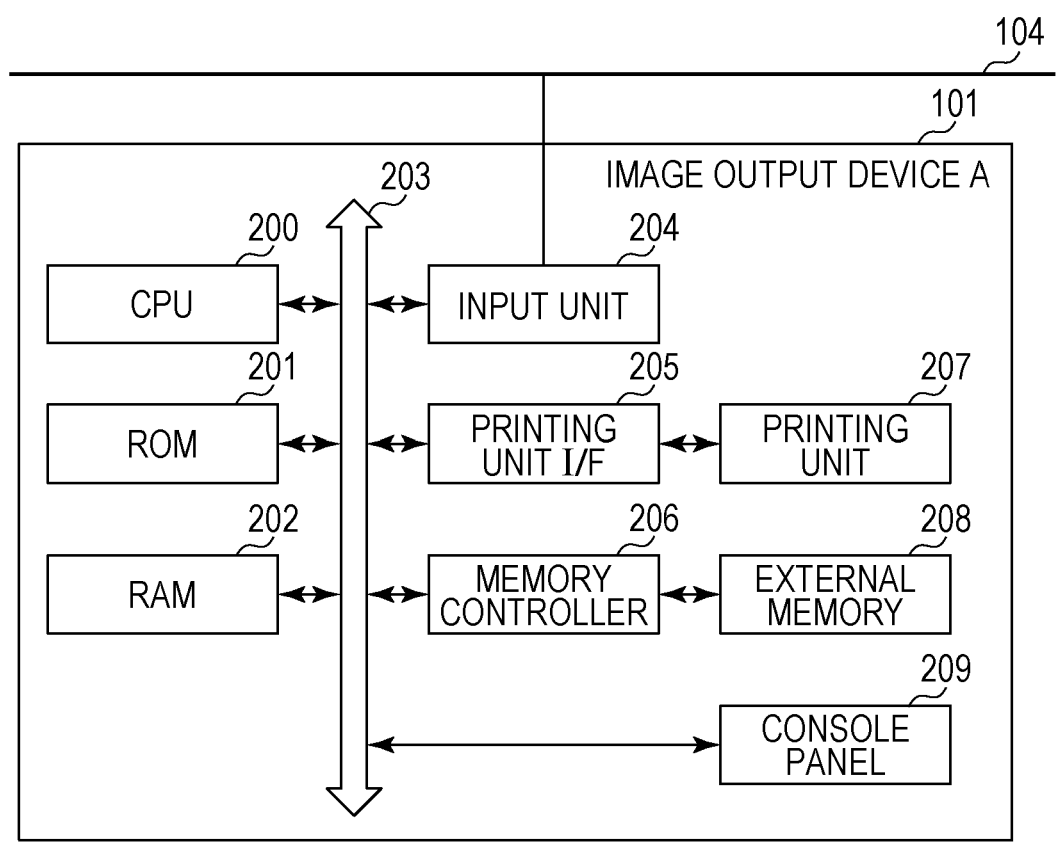
FIG. 2 is a diagram illustrating an example hardware configuration of an image output device according to the embodiment.

FIG. 2 is a diagram illustrating an example hardware configuration of the image output device A 101. Since the image output devices B 102 and C 103 have the same configuration, description thereof is omitted. Any image output devices may be managed by the PC 100 as long as the image output devices are each capable of outputting an image on a recording medium. The management target image output devices may have the same configuration, partially different configurations, or respectively different configurations.

The image output device A 101 is controlled by a central processing unit (CPU) 200. The CPU 200 operates in accordance with a control program or other programs stored in a read-only memory (ROM) for programs in a ROM 201 or an external memory 208. The CPU 200 outputs an image signal as output information to a printing unit (printer engine) 207 connected to a printing unit interface (I/F) 205 through a system bus 203. The CPU 200 may perform processing for communication with the PC 100 through an input unit 204 and may notify the PC 100 of information stored in the image output device A 101. The CPU 200 may also receive, through the input unit 204, output data to be output to the printing unit 207. A random-access memory (RAM) 202 functions as a main memory, a work area, and other areas for the CPU 200 and is configured such that a memory capacity may be extended by using an optional RAM connected to an extension port (not illustrated). The RAM 202 is used as a rasterization region, an environment data storage region, a non-volatile memory, and other regions. A memory controller 206 controls access to the external memory 208 such as a hard disk (HDD) or an integrated circuit (IC) card. The external memory 208 may be connected as an optional component and stores font data, an emulation program, form data, information regarding paper types registered for an image output device, attribute information regarding the paper type, and other information. A console panel 209 has a panel to display various pieces of information.

Figure 3:
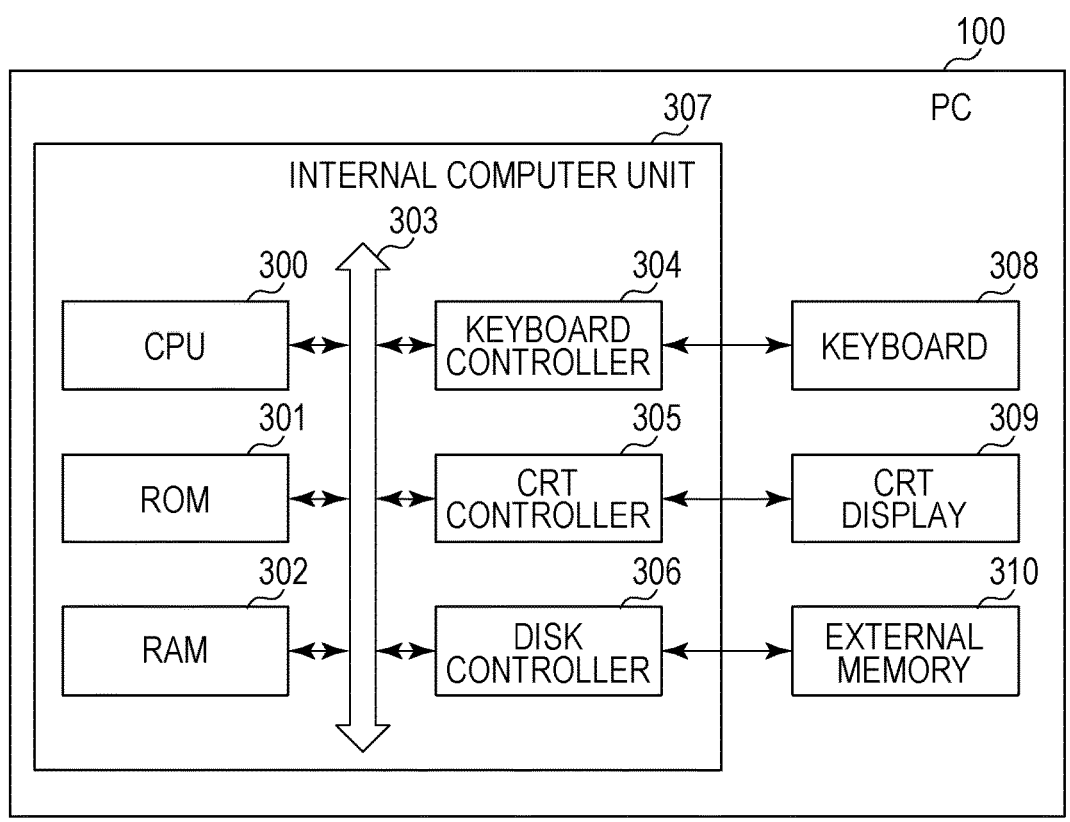
FIG. 3 is a diagram illustrating an example hardware configuration of a personal computer (PC) according to the embodiment.

FIG. 3 is a block diagram illustrating an example configuration of a computer corresponding to the PC 100 in FIG. 1. An internal computer unit 307 includes a CPU 300, a ROM 301, a RAM 302, a keyboard controller 304, a cathode ray tube (CRT) controller 305, and a disk controller 306.

The CPU 300 reads out various programs such as a control program, a system program, and application programs from an external memory 310 to the RAM 302 through the disk controller 306. The CPU 300 performs various data processing operations by running the various programs read out to the RAM 302 and performs display control on a display 309. The CPU 300 may also read out the control program and other programs from the ROM 301. The CPU 300 may be a dedicated circuit such as an application specific integrated circuit (ASIC). The CPU 300 and the dedicated circuit are examples of a hardware circuit and a hardware processor.

The disk controller 306 controls access to the external memory 310 such as a floppy disk (FD), a hard disk (HD), a compact disc ROM (CD-ROM), a digital versatile disk ROM (DVD-ROM), a mini disc (MD), and a magneto-optical disk (MO).

The RAM 302 is configured such that the capacity may be extended by using an optional RAM (not illustrated) or other components and is mainly used as a work area for the CPU 300.

The keyboard controller 304 controls key input from a keyboard 308 or a pointing device (not illustrated). The CRT controller 305 controls display on the CRT display 309.

In the embodiment of the invention, the CPU 300 controls, through a main bus 303, the components connected to the main bus 303 unless otherwise particularly noted.

Figure 4:
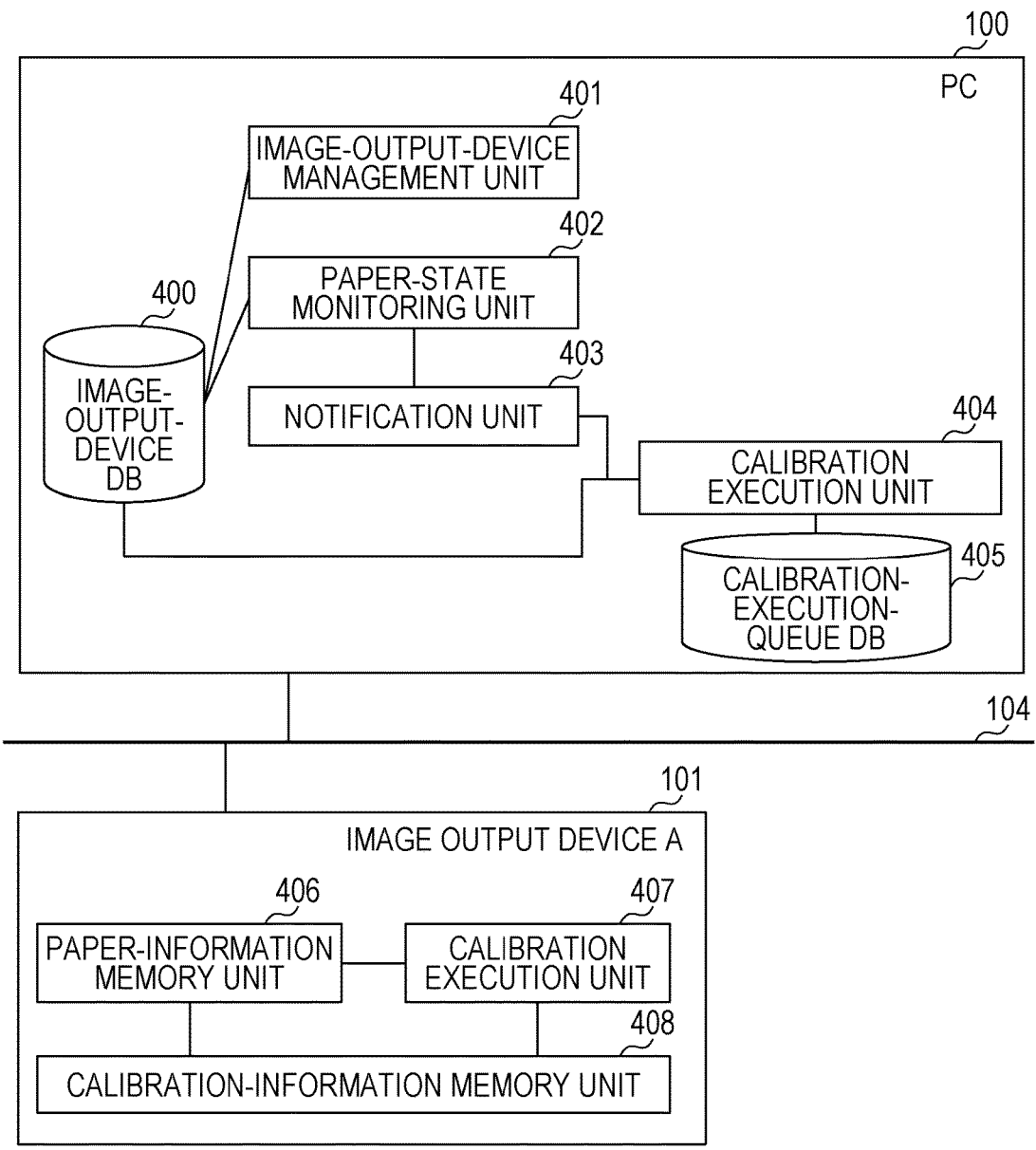
FIG. 4 is a diagram illustrating an example functional block of a management system according to the embodiment.

FIG. 4 is a diagram illustrating an example functional block of the system including the PC 100 and an image output device group (the image output devices A 101 to C 103) described with reference to FIGS. 1 to 3.

First, calibration-related functional blocks in the image output device A 101 will be described. A paper-information memory unit 406 stores paper information provided for each paper type used for printing performed by the image output device A 101. The paper-information memory unit 406 stores paper information regarding the types of paper usable by the image output device A 101. Priority is given to the paper types registered in advance in the paper-information memory unit 406, and, for example, priority such as a default paper type and other paper types is determined. In addition, if a new paper type is additionally registered in the image output device A 101, the order of registration is stored. Further, if a user sets paper information by using the console panel 209, the paper-information memory unit 406 also stores the set information regarding the current fed paper. A calibration execution unit 407 prints a predetermined patch image on paper of a specific type, performs colorimetry on the patches by using the density sensor, and identifies a correction value for target calibration data. The result of the calibration executed by the calibration execution unit 407 together with pieces of information regarding the type of the paper for which the calibration has been executed (hereinafter, also referred to as calibration-experienced paper) and the date and time of the calibration execution is stored in a calibration-information memory unit 408.

The functional blocks of the PC 100 in FIG. 4 will next be described. An image-output-device DB 400 stores set values for the PC 100 to unitedly manage the management target image output device group (image output devices A 101 to C 103). An image-output-device management unit 401 has a function of acquiring various pieces of information to be stored in the image-output-device DB 400 from each of the image output devices A 101 to C 103 by searching for the management target image output devices through the network. The set values acquired by the image-output-device management unit 401 are recorded in the image-output-device DB 400. From each of the image output devices A 101 to C 103 (image output device group) managed by the image-output-device DB 400, a paper-state monitoring unit 402 acquires information stored in the calibration-information memory unit 408 of each of the image output devices A 101 to C 103 (image output device group). The information acquired by the paper-state monitoring unit 402 is recorded in the image-output-device DB 400. The calibration execution unit 407 monitors the image-output-device DB 400 and causes the corresponding one of the image output devices A 101 to C 103 (image output device group) to execute the calibration as necessary. A calibration-execution-queue DB 405 retains information regarding execution of the calibration. A notification unit 403 sends notification to a display or other components of the PC 100 or other terminal devices of predetermined information in accordance with triggers from the paper-state monitoring unit 402 and a calibration execution unit 404. For example, a calibration failure on one of the managed image output devices will be described. The calibration execution unit 404 generates failure notification information indicating a failure of the calibration execution managed by the calibration-execution-queue DB 405. The notification unit 403 sends the display of the PC 100 notification indicating the failure notification information generated by the calibration execution unit 404. For example, the paper-state monitoring unit 402 generates application status information indicating the status of application of information regarding paper used by the image-output-device DB 400. The notification unit 403 sends the display of the PC 100 or other terminal devices notification indicating the application status information generated by the paper-state monitoring unit 402.

FIG. 5 illustrates example data stored in the image-output-device DB 400 in FIG. 4. The image-output-device DB 400 stores various pieces of information regarding the management target image output device group (image output devices A 101 to C 103) to manage the pieces of information by using the PC 100. Examples of the pieces of information stored in the image-output-device DB 400 include information regarding a device, information regarding a paper type, and information regarding the calibration. A managed terminal 500 is used to indicate information for identifying a terminal of the management target image output device group (image output devices A 101 to C 103). For example, the information is a terminal identifier (ID). Based on the managed terminal 500, integrated management is performed by using the PC 100 on various pieces of information regarding each management target image output device, the various pieces of information being a device name 501, a device address 502, paper information 503, a calibration application status 504, and calibration-execution-date information 505.

The device name 501 is used to indicate a device name settable by the user for the image output device at user's option. The device name 501 is acquired by the image-output-device management unit 401 from the image output device and stored in the image-output-device DB 400. The device address 502 is used to indicate the address (such as an IP address), on the network, of the image output device.

The device address 502 is acquired by the image-output-device management unit 401 from the image output device and stored in the image-output-device DB 400.

The paper information 503 and the calibration application status 504 are information referred to when the calibration is executed. The paper information 503 is acquired by the image-output-device management unit 401 from the paper-information memory unit 406 of the image output device.

The paper information 503 includes information related to the availability of calibration execution such as the calibration-executable paper and the calibration-unexecutable paper. In the case of an image output device from which current fed paper is identifiable, current-fed-paper information stored in the paper-information memory unit 406 of the image output device is acquired and recorded as the paper information 503. In contrast in the case of image output devices (printers F and G) from which current fed paper is not identifiable, information regarding a paper type is selected from a list of pieces of paper information acquired from the paper-information memory unit 406 (see an area 700 in FIG. 5) and is recorded. Note that a paper type to be selected from the list of pieces of paper information is a type of paper classified as calibration-executable paper. If the paper information list has a plurality of paper types classified as calibration-executable paper type, one of the paper types is selected. In the embodiment, if current-fed-paper information is not acquirable from an image output device, and if the list paper information of the image output device has a plurality of paper types classified as calibration-executable paper, a paper type with the oldest registration date and time in the list of pieces of paper information is selected. The method for selecting one of the calibration-executable paper types is not limited thereto. For example, a paper type having the latest calibration execution date, the latest printing execution date, or a paper type given the highest priority set in advance may be selected. If the list paper information has no calibration-executable paper type, one of the paper types in the list acquired from the paper-information memory unit 406 (for example, the first paper type in the list) is recorded as the paper information 503.

The calibration application status 504 is used to indicate information that is acquired by the paper-state monitoring unit 402 from the calibration-information memory unit 408 of the image output device and that indicates the status of calibration execution for the paper type recorded as the paper information 503. The calibration application status 504 of the paper information is mainly classified into three statuses of "applied", "unapplied", and "no data". If calibration has been executed at least one time for a paper type recorded as the paper information 503 for the image output device, the status is "applied". If calibration has not been executed for a paper type recorded as the paper information 503 for the image output device, the status is "unapplied". If calibration is not executable for a paper type recorded as the paper information 503, the status is "no data". If a paper type recorded as the paper information 503 for the image output device is calibration-executable paper, but if calibration has not been executed for the paper type, the status is "unapplied". If a paper type recorded as the paper information 503 for the image output device is calibration-unexecutable paper, the status is "no data".

The calibration-execution-date information 505 is used to indicate the date of calibration execution for a paper type recorded as the paper information 503 for the image output device. Specifically, the calibration-execution-date information 505 is managed for each image output device and acquired from the image output device by the image-output-device management unit 401 or the paper-state monitoring unit 402.

The image-output-device DB 400 according to the embodiment further stores model information (such as a type A and a type B but not illustrated) of an image output device that is a managed terminal.

Figure 6:
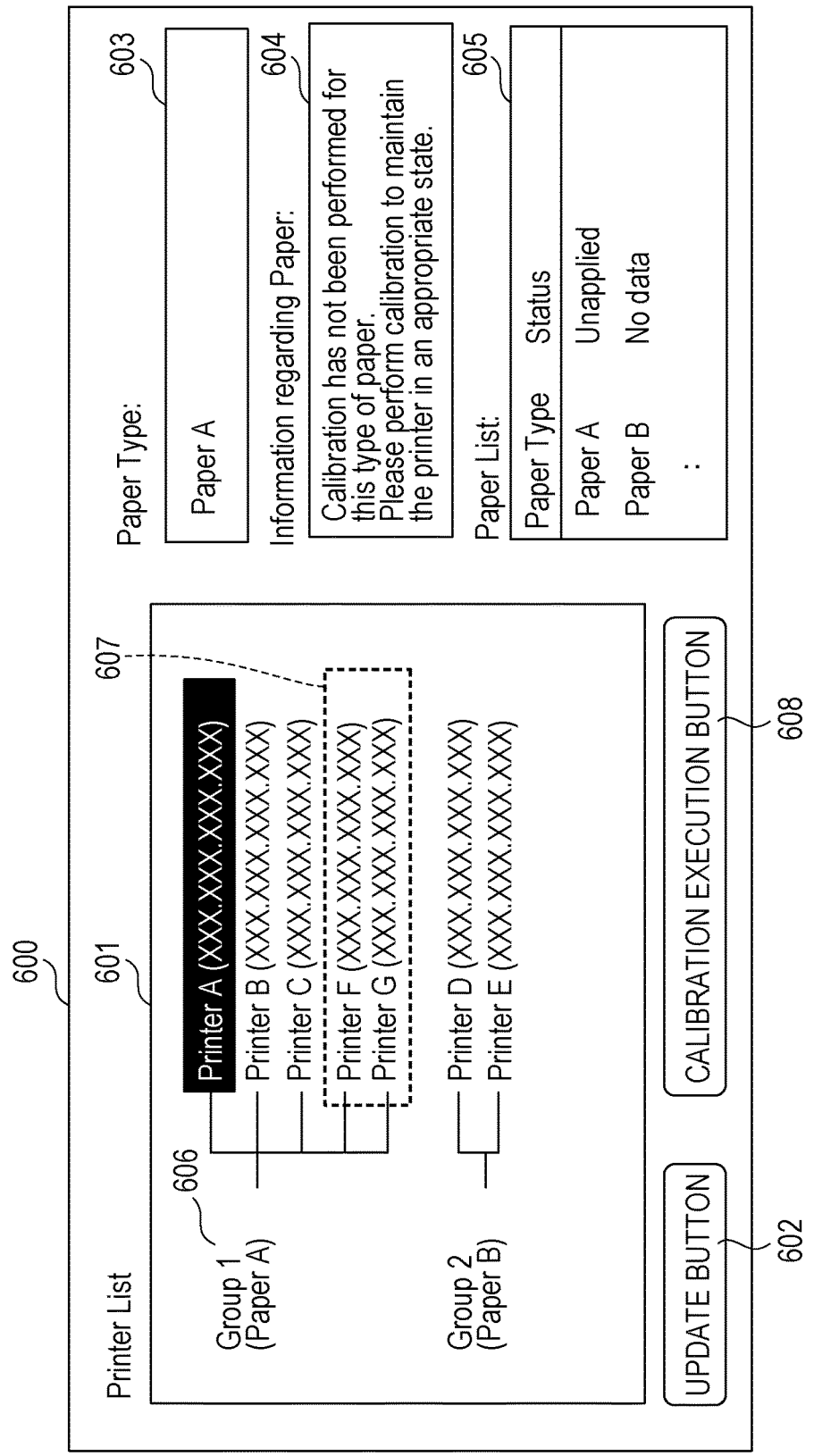
FIG. 6 is a diagram illustrating an example management screen displayed on the PC of the management system.

The management method used by the management system will be described with reference to FIG. 6. The management system manages a management target image output device group by using the PC 100 based on data recorded in the image-output-device DB 400 illustrated in FIG. 4. When activating a management application on the PC 100, the management system displays a management screen 600 illustrated in FIG. 6 on the display 309 of the PC 100. The management screen 600 has a printer-list display region 601, a paper-type display region 603, a display region 604 for information regarding current fed paper, and a paper-list display region 605. The management screen 600 also has an update button 602 for updating the printer-list display region 601 and a calibration execution button 608. The printer-list display region 601 is used to display a list of management target image output devices. Specifically, the management target image output devices stored in the image-output-device DB 400 are displayed on a per-group basis. In the embodiment, the device name 501 and the device address 502 of the management target image output devices are displayed. Note that grouping of the image output devices will be described later. The device names displayed in the printer-list display region 601 are provided in accordance with the device name 501 of the image-output-device DB 400 retained in the PC 100. The device addresses displayed in the printer-list display region 601 are provided in accordance with the device address 502 of the image-output-device DB 400 retained in the PC 100. In the embodiment, printer names and printer addresses of the managed terminal devices are displayed in the printer-list display region 601 as illustrated in FIG. 6, but the displayed items are not limited thereto. For example, only the device names may be displayed. Further, other information regarding the printers may also be displayed.

The paper-type display region 603 is used to display a paper name included in the paper information 503 of the image output device selected in the printer-list display region 601. In FIG. 6, the printer A is selected, and the name "Paper A" of the current paper fed in the printer A is thus displayed in the paper-type display region 603. In the embodiment, only the paper name is displayed in the paper-type display region 603 as illustrated in FIG. 6, the displayed item is not limited thereto. The type of the paper or date information may also be displayed.

The display region 604 for the paper information is used to display information regarding the paper displayed in the paper-type display region 603 based on the calibration application status 504 in FIG. 5. In the embodiment, a predetermined message is displayed depending on the calibration application status recorded in the calibration application status 504. For example, if the calibration application status of the paper information regarding the paper displayed in the paper-type display region 603 is "unapplied", the message "Calibration has not been performed for this type of paper. Please perform calibration to maintain the printer in an appropriate state." is displayed in the display region 604. For example, if the calibration application status of the paper information regarding the paper displayed in the paper-type display region 603 is "applied", the message "You are advised to perform calibration to maintain the printer in an appropriate state." is displayed in the display region 604. For example, if the calibration application status of the paper information regarding the paper displayed in the paper-type display region 603 is "no data", the message indicating "This type of paper is not usable to perform calibration. Please use calibration-executable paper to perform the calibration." is displayed in the display region 604. In the embodiment, only the calibration application status of the paper information regarding the paper displayed in the paper-type display region 603 is displayed in the display region 604 as illustrated in FIG. 6, but the displayed item is not limited thereto. For example, a printer name, date information, or symbol information for indicating the type of information may also be displayed.

The paper-list display region 605 is used to display pieces of paper information registered in the paper-information memory unit 406 of the image output device selected in the printer-list display region 601. In FIG. 6, paper names and calibration application statuses of the paper information are displayed as the paper information. Date information, paper type information, paper category information, a symbol for indicating the aforementioned information may also be displayed as the paper information. In the embodiment, the pieces of paper information are arranged in the paper-list display region 605 in chronological order of setting in the paper-information memory unit 406 of the image output device selected in the printer-list display region 601. Specifically, paper types are arranged in accordance with the priority set for the image output device and in chronological order of registration. The order in which the pieces of paper information are arranged in the paper-list display region 605 is not limited thereto. The pieces of paper information may be arranged in chronological order of calibration execution, in alphabetical order of the paper name, or in order based on another criterion. In FIG. 6, the paper names and calibration application statuses of the paper information are displayed as the paper information. However, the user may be notified of the details of the status of the paper by clicking on a "status" indicator.

The update button 602 is a start button for causing the image-output-device management unit 401 to execute update of the image-output-device DB 400. When the update button 602 is clicked, the display regions in the management screen 600 are updated with the latest states of all of the management target image output devices. Specifically, the PC 100 acquires one or more pieces of most recent information corresponding to the device name 501 from the management target image output devices, registers the pieces of latest information in the image-output-device DB 400, and displays the pieces of latest information corresponding to the device name 501 in the printer-list display region 601 of the management screen 600.

The calibration execution button 608 is a start button for executing calibration on the image output device selected in the printer-list display region 601. When the calibration execution button 608 is clicked, the calibration execution unit 404 causes the image output device selected in the printer-list display region 601 to execute the calibration.

The printer-list display region 601 is used to display the management target image output devices divided into groups based on information recorded in the image-output-device DB 400 (see an area 606 in FIG. 6). Here, grouping of management target image output devices will be described. Among the management target image output devices, image output devices having the same specific information are displayed in such a manner as to belong to the same group. In the embodiment, the specific information is information in the paper information 503. More specifically, image output devices having the same paper information 503 are displayed in such a manner as to belong to the same group. In FIG. 6, Group 1 is a group of image output devices having the paper information 503 indicating Paper A, that is, image output devices in which Paper A is fed. Group 2 is a group of image output devices having the paper information 503 indicating Paper B, that is, image output devices in which Paper B is fed. In the embodiment, whether the model of the image output device is managed by the management system is also a criterion for grouping. Note that the model of the image output device to be managed by the management system may be set in advance by the management system. In addition, the image output devices are displayed in groups based on the paper information 503 in the embodiment, but the criterion for the grouping is not limited thereto. For example, the image output devices may be managed in groups based on the model of the image output devices and may be displayed in groups based on other information regarding the printers.

In the embodiment, even though the current-fed-paper information is not acquirable from an image output device (also referred to as an image output device not providing current-fed-paper information), the PC 100 sets the paper information 503 for the image output device in the data in the image-output-device DB 400. As illustrated in an area 607 in FIG. 6, the management target image output devices including an image output device not providing current-fed-paper information may be displayed in groups.

In the embodiment, when the management application of the management system is activated in the management system, and when the update button 602 is clicked, various pieces of information regarding the management target image output devices in the image-output-device DB 400 are updated. The management screen 600 is displayed on the display 309 based on the information registered in the image-output-device DB 400.

Figure 8:
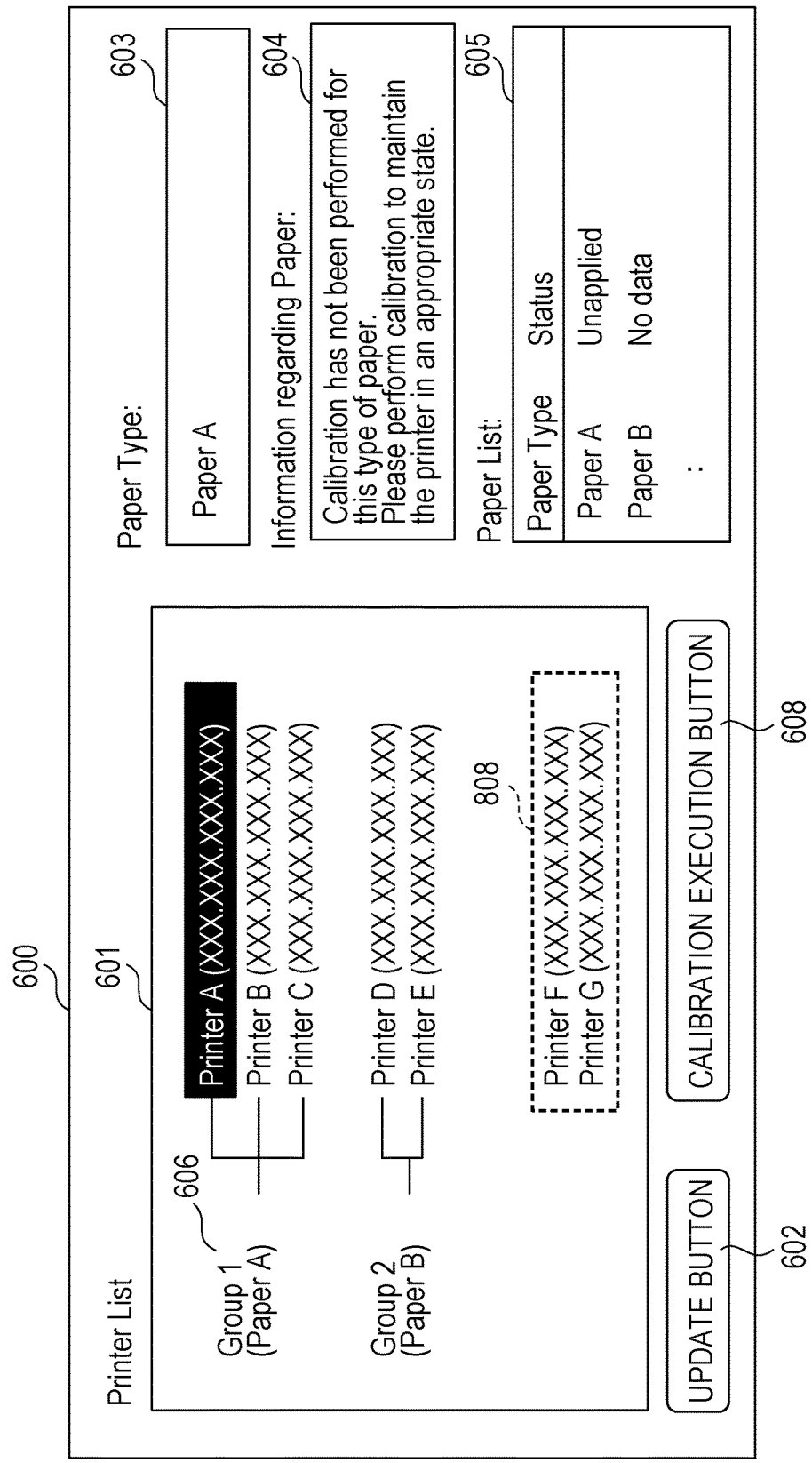
FIG. 8 is a diagram illustrating an example management screen of the PC of the management system.

A case where grouping of the management target image output devices is prevented will be described by using FIGS. 7 and 8. When the update button 602 is clicked, the display regions in the management screen 600 are updated with the latest states of all of the management target image output devices. However, even though an image output device is managed before the update, the application of the management system is prevented from causing the PC 100 to search for the image output device in some cases after the update button 602 is clicked. For example, when the image output device is not connected to the network, information is not acquirable. If the image output device is not found, information regarding the image output device is not acquirable. In this case, the image output device is displayed outside the printer-list display region 601 as illustrated in FIG. 8. In addition, a method for adding or deleting a management target image output device in the management system will be described. To add a management target image output device in the management system, an image output device to be added is selected from image output devices that are of models managed by the management system and that have been found successfully by the PC 100. After the image output device to be added is selected, the image output device is additionally displayed in the printer-list display region 601. Note that image output devices successfully found by the PC 100 are the image output devices connected to the PC 100 through the network. To delete a management target image output device in the management system, an image output device in the printer-list display region 601 in the management screen 600 is selected and deleted. This enables the specific selected and deleted image output device to be excluded from the management targets.

Figure 9:
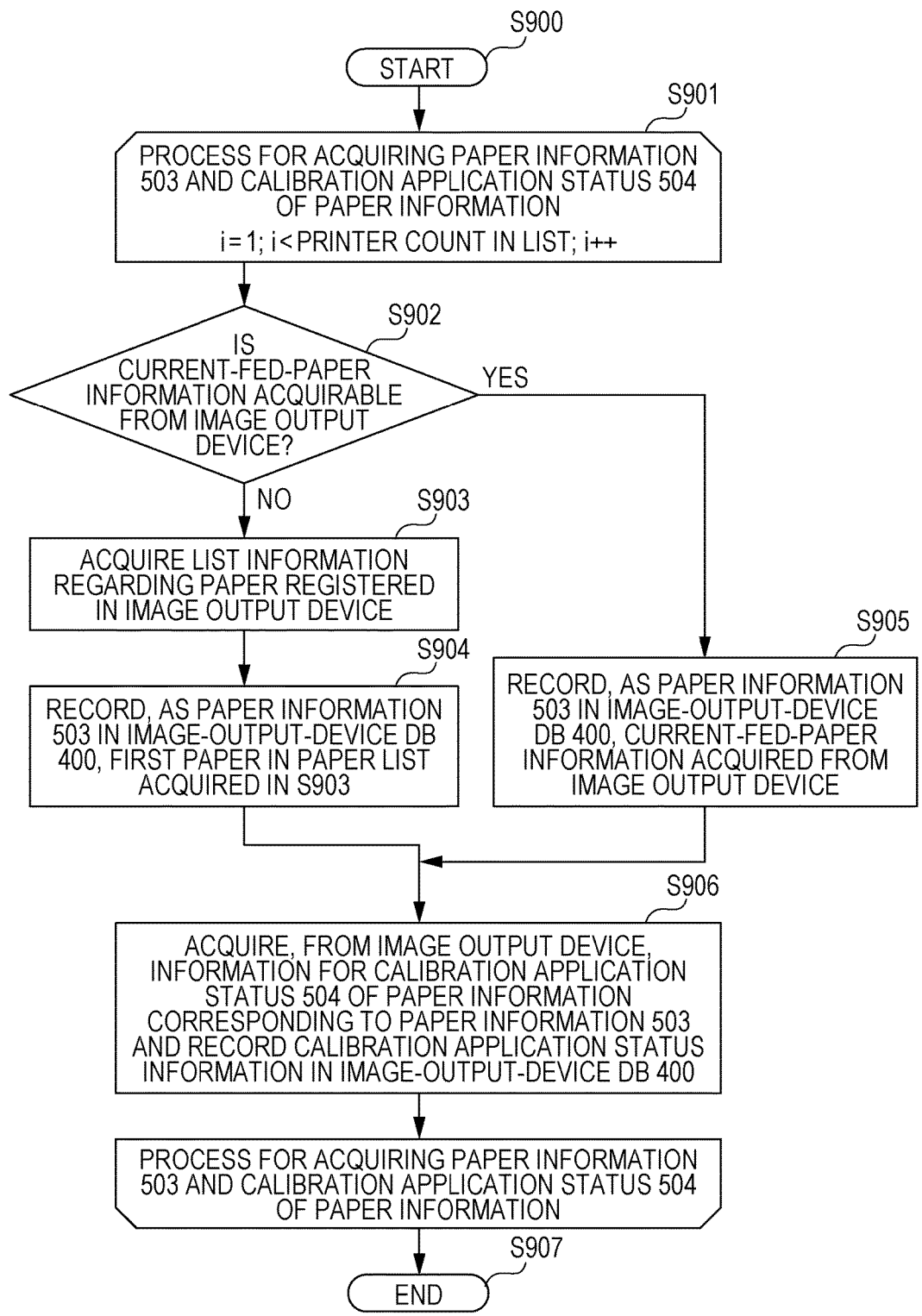
FIG. 9 is a flowchart illustrating example operations of a management system according to a first embodiment.

FIG. 9 illustrates an example flow of operations executed by the PC 100. The flowchart illustrated in FIG. 9 is implemented, for example, in such a manner that the CPU 300 reads out a program stored in the ROM 301 into the RAM 302 and executes the program.

When the management application is activated, management processing is started (S900). Acquisition of the paper information and the calibration application status of the paper information is repeated until the processing is performed for all of management target image output devices (S901).

First, it is checked whether the current-fed-paper information is acquirable for the corresponding image output device (S902). If the current-fed-paper information is acquirable from the image output device (YES in S902), the current-fed-paper information is acquired from the paper-information memory unit 406 of the image output device and is recorded in the paper information 503 of the image-output-device DB 400 (S905). The processing proceeds to step S906.

If the current-fed-paper information is not acquirable from the image output device (NO in S902), list information regarding registered paper types is acquired from the paper-information memory unit 406 of the image output device (S903). The first paper type in the calibration-executable paper types in the paper list information acquired in step S903 is recorded as the paper information 503 in the image-output-device DB 400 (S904). In the embodiment, pieces of information in the paper list are arranged in chronological order of a registration date, and the first paper type has the oldest registration date. Note that the paper type stored as the paper information 503 is not limited to the paper type having the oldest registration date. A paper type for which printing is performed most recently, or a paper type that satisfies a criterion set by the user may be stored as the paper information 503. The processing proceeds to step S906.

In step S906, information for the calibration application status 504 indicating the calibration application status of the paper information and the calibration-execution-date information 505 that correspond to the paper information 503 recorded in the image-output-device DB 400 are acquired from the management target image output device and are recorded in the image-output-device DB 400. After update of the image-output-device DB 400 is complete for all the management target image output devices, the operation flow in FIG. 9 is terminated (S907). The user interface of the management system, that is, the management screen 600 is updated.

In the embodiment, image output devices from which current-fed-paper information is acquirable (image output devices providing current-fed-paper information) may be grouped based on current fed paper, and the status of the calibration for the paper may be checked. In contrast, image output devices not providing current-fed-paper information may be grouped based on the calibration-executable paper, and the status of the calibration for the paper may be checked.

Second Embodiment

Figure 10:
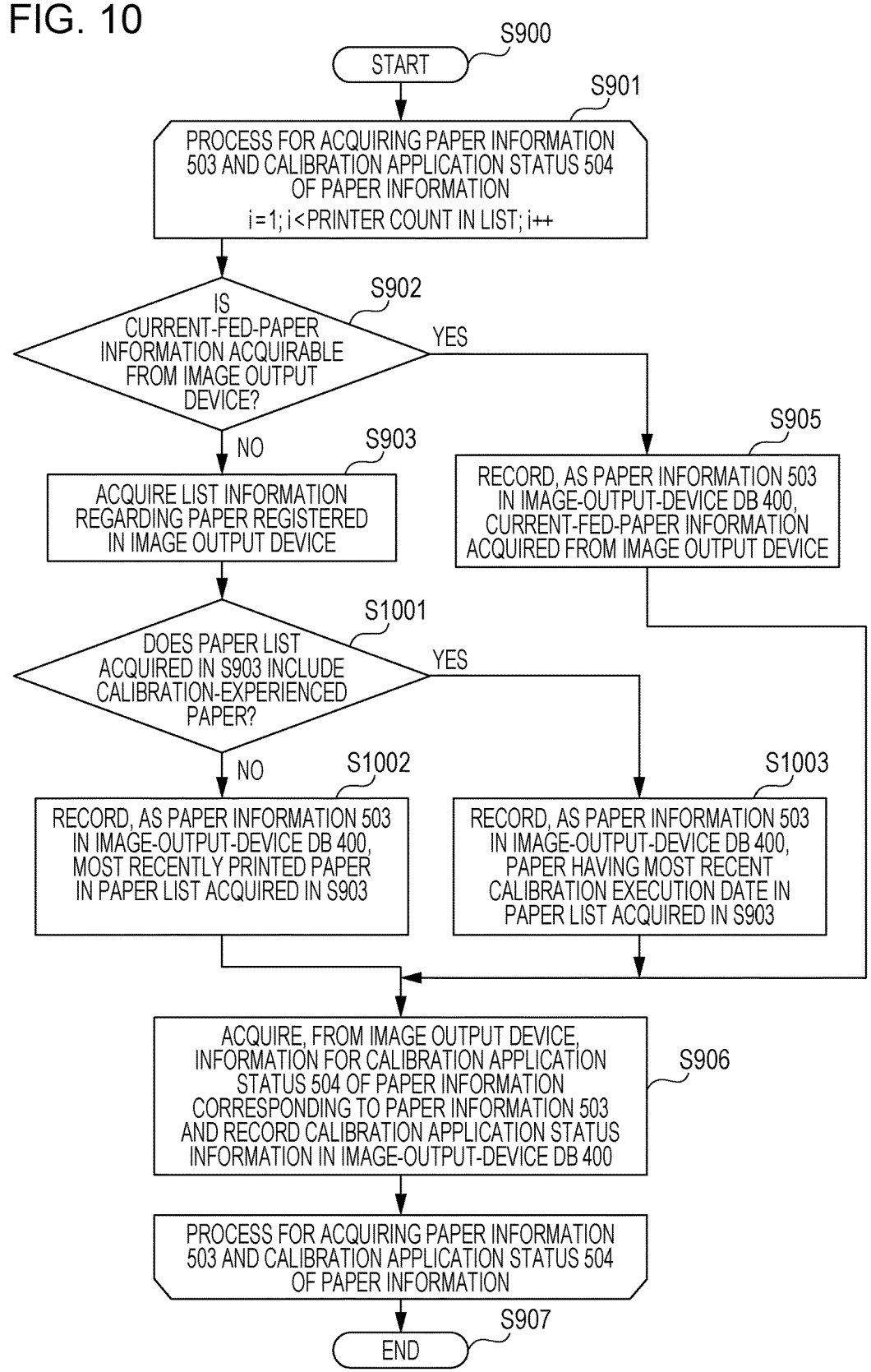
FIG. 10 is a flowchart illustrating example operations of a management system according to a second embodiment.

Hereinafter, an embodiment of the invention that is different from the first embodiment will be described in detail with reference to the drawings. Note that the same components exerting the same effects as those in the first embodiment are denoted by the same reference numerals, and repeated explanation of the components is omitted. In the second embodiment, only a method for setting the paper information 503 for an image output device not providing current-fed-paper information is different from that in the first embodiment. FIG. 10 illustrates an example flow of operations of the PC 100 according to the embodiment. Only points different from those in the first embodiment will be described below.

After the paper list information registered in the image output device not providing current-fed-paper information is acquired in step S903, it is checked whether the paper list information acquired in step S903 includes calibration-experienced paper (S1001). If the paper list information includes a calibration-experienced paper type (YES in S1001), a paper type having the most recent calibration execution date in the paper list information is recorded as the paper information 503 in the image-output-device DB 400 (S1003). If the paper list information does not include a calibration-experienced paper type (NO in S1001), most recently printed paper in the paper list information is recorded as the paper information 503 in the image-output-device DB 400 (S1002). After step S1003 or S1004, step S906 in FIG. 9 is executed.

In the embodiment as in the first embodiment, image output devices providing current-fed-paper information may be grouped based on current fed paper, and the status of the calibration for the paper may be checked. In contrast, image output devices not providing current-fed-paper information may be grouped based on the calibration-executable paper, and the status of the calibration for the paper may be checked.

In the embodiment, it is checked whether the paper list information acquired in step S903 includes calibration-experienced paper. However, the check item is not limited thereto. It may be checked whether another piece of information such as information regarding calibration-executable paper, paper being printed most recently, or paper satisfying a criterion designated by the user is present. In addition, if the paper list information does not include calibration-experienced paper, a plurality of pieces of information including an additional piece of information may be searched for, for example, it is checked whether the calibration-executable paper is present.

According to the embodiments described above, group management may be appropriately performed on each management target image output device based on the information regarding the paper type used in the image output device.

Figure 11:
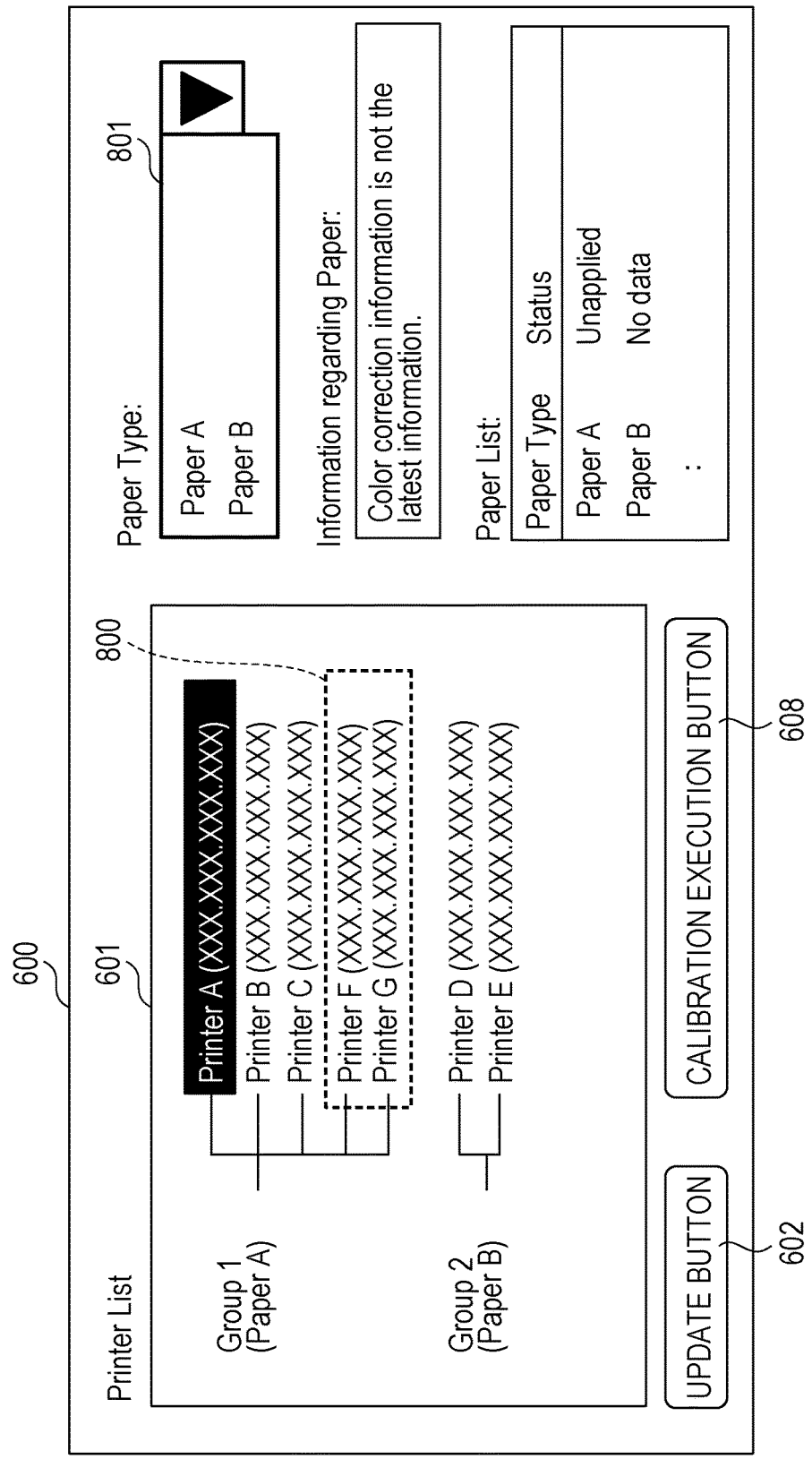
FIG. 11 is a diagram illustrating an example management screen of the PC of the management system.

The invention is not limited to the embodiments described above. For example, although the paper name in the paper information 503 of the image output device selected in the printer-list display region 601 is displayed in the paper-type display region 603 in the embodiments described above, the displayed item is not limited thereto. For example, calibration-executable paper registered in the image output device selected in the printer-list display region 601 may be displayed in the paper-type display region 603. If a plurality of types of paper classified as calibration-executable paper have been registered in the selected the image output device, one of the types of paper classified as calibration-executable paper may be selected by using a pull-down menu 801 as illustrated in FIG. 11. If the paper type is changed by using the pull-down menu 801 for the image output device selected in the printer-list display region 601, an indicator in the display region 604 for the paper information is updated with information regarding the paper type selected using the pull-down menu 801. Alternatively, a calibration-experienced paper type may be displayed. If there are a plurality of calibration-experienced paper types, a plurality of pieces of information regarding the respective calibration-experienced paper types may be displayed.

Moreover, in the embodiments described above, the paper type to be acquired instead of the current-fed-paper information is not limited to the paper type described above and may be, for example, a paper type input by the user by using the input unit 204 or other components. In the embodiments described above, the image output devices providing current-fed-paper information and the image output devices not providing current-fed-paper information are mixed together in the group display. However, the group display is not limited thereto and may be performed, for example, on a per-model basis. In this case, an image output device of a model not providing current-fed-paper information is displayed in a group different from a group of image output devices of a model providing current-fed-paper information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110373, filed May 29, 2015 which is hereby incorporated by reference herein in its entirety.

What is claimed is:

1. A controller comprising:
one or more processors coupled to one or more memories, the one or more processors operating to:
acquire information of a paper type from each of a plurality of image output devices managed in a management system;
perform grouping of a plurality of managed image output devices based on the acquired information of the paper type information; and
cause a display unit to display information indicating the managed image output devices having undergone the grouping performed,
wherein, in a case where information of a paper type fed in a managed image output device is successfully acquired from the managed image output device, the grouping for the managed image output information is performed based on the acquired information of the paper type, and
wherein, in a case where information of a paper type fed in a managed image output device fails to be acquired from the managed image output device, the grouping for the managed image output device is performed based on calibration-executable paper type information included in information of paper types registered in the managed image output device.

2. The controller according to claim 1,
wherein, in a case where the information of the paper type fed in a managed image output device from the managed image output device is not acquired, the grouping for the managed image output device is performed based on calibration-executable paper type information included in the information of the paper types registered in the managed image output device and based on information of paper types that have already been calibrated.

3. The controller according to claim 1,
wherein the one or more processors further operating to acquire calibration information for the paper type from each managed image output device, and
wherein information on the basis of the acquired calibration information for a selected one of the managed image output devices is displayed on the display unit.

4. The controller according to claim 1,
wherein, from each image output device, information regarding a paper type usable by the image output device is acquired as the information of the paper types registered in the managed image output device.

5. The controller according to claim 1,
wherein the one or more processors further operate to cause the image output devices managed in the management system to execute calibration.

6. The controller according to claim 1,
wherein, in a case where the calibration-executable paper type is not included in the paper types registered in the managed image output device, the grouping for the managed image output device is performed based on a paper type used last for printing among the paper types registered in the managed image output device.

7. The controller according to claim 1,
wherein, in a case where the calibration-executable paper type is included in the paper types registered in the managed image output device, the grouping for the managed image output device is performed based on a paper type of latest date of calibration execution among the calibration-executable paper types.

8. The controller according to claim 1,
wherein the one or more processors further operates to execute a search for the managed image output devices in an update timing, and wherein managed input image output devices not found as a result of the search are not grouped.

9. A controller comprising:
one or more processors coupled to one or more memory, the one or more processors operating to:
acquire information of a paper type from each of a plurality of image output devices managed in a management system;
perform grouping of a plurality of managed image output devices based on the acquired information of the paper type information; and
cause a display unit to display information indicating the managed image output devices having undergone the grouping performed,
wherein, in a case where information of a paper type fed in a managed image output device from the managed image output device is successfully acquired, the grouping for the managed image output information is performed based on the acquired information of the paper type, and
wherein, in a case where information of a paper type fed in a managed image output device from the managed image output device fails to be acquired, the grouping for the managed image output device is performed based on any one of information regarding paper type designated by a user and information regarding paper type used for printing at the managed image output device.

10. A control method comprising:
acquiring information of a paper type from each of a plurality of image output devices managed in a management system;
performing grouping of a plurality of managed image output devices based on the acquired information of the paper type information; and
displaying information indicating the managed image output devices having undergone the grouping performed on a display unit,
wherein, in a case where information of a paper type fed in a managed image output device is successfully acquired from the managed image output device, the grouping for the managed image output information is performed based on the acquired information of the paper type, and
wherein, in a case where information of a paper type fed in a managed image output device fails to be acquired from the managed image output device, the grouping for the managed image output device is performed based on calibration-executable paper type information included in information of paper types registered in the managed image output device.

11. The control method according to claim 10,
wherein, in a case where the information of the paper type fed in a managed image output device from the managed image output device is not acquired, the grouping for the managed image output device is performed based on calibration-executable paper type information included in the information of the paper types registered in the managed image output device and based on information of paper types that have already been calibrated.

12. The control method according to claim 10,
wherein in the acquiring, calibration information for the paper type are acquired from each managed image output device, and
wherein information on the basis of the acquired calibration information for a selected one of the managed image output devices is displayed on the display unit.

13. The control method according to claim 10,
wherein from each image output device, information regarding a paper type usable by the image output device is acquired as the information of the paper types registered in the managed image output device.

14. The controller according to claim 10,
wherein, in a case where the calibration-executable paper type is not included in the paper types registered in the managed image output device, the grouping for the managed image output device is performed based on a paper type used last for printing among the paper types registered in the managed image output device.

15. The controller according to claim 10,
wherein, in a case where the calibration-executable paper type is included in the paper types registered in the managed image output device, the grouping for the managed image output device is performed based on a paper type of latest date of calibration execution among the calibration-executable paper types.

16. The controller according to claim 10,
wherein the one or more processors further operates to execute a search for the managed image output devices in an update timing, and
wherein managed input image output devices not found as a result of the search are not grouped.

17. A non-transitory computer-readable recording medium storing a program causing a computer to execute:
acquiring information of a paper type from each of a plurality of image output devices managed in a management system;
performing grouping of a plurality of managed image output devices based on the acquired information of the paper type information; and
causing a display unit to display information indicating the managed image output devices having undergone the grouping performed,
wherein, in a case where information of a paper type fed in a managed image output device is successfully acquired from the managed image output device, the grouping for the managed image output information is performed based on the acquired information of the paper type, and
wherein, in a case where information of a paper type fed in a managed image output device fails to be acquired from the managed image output device the grouping for the managed image output device is performed based on calibration-executable paper type information included in information of paper types registered in the managed image output device.

* * * * *